United States Patent
Lee et al.

(10) Patent No.: US 10,333,981 B2
(45) Date of Patent: Jun. 25, 2019

(54) METHOD AND APPARATUS FOR SECURITY CHECKING OF IMAGE FOR CONTAINER

(71) Applicant: SAMSUNG SDS CO., LTD., Seoul (KR)

(72) Inventors: Wonjun Lee, Seoul (KR); Mi-Yeong Lee, Seoul (KR); Chan-Hun Jeong, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 460 days.

(21) Appl. No.: 15/074,312

(22) Filed: Mar. 18, 2016

(65) Prior Publication Data

US 2017/0054759 A1  Feb. 23, 2017

(30) Foreign Application Priority Data

Aug. 19, 2015  (KR) .................. 10-2015-0116471

(51) Int. Cl.
   *H04L 29/06* (2006.01)
   *G06F 9/455* (2018.01)
   *G06F 21/53* (2013.01)

(52) U.S. Cl.
   CPC .......... *H04L 63/20* (2013.01); *G06F 9/45558* (2013.01); *H04L 63/1425* (2013.01); *H04L 63/1433* (2013.01); *G06F 9/455* (2013.01); *G06F 21/53* (2013.01); *G06F 2009/45587* (2013.01)

(58) Field of Classification Search
   CPC . H04L 63/1425; H04L 9/455; H04L 63/1433; H04L 63/20; H04L 9/45558; H04L 2009/45587; G06F 21/53
   See application file for complete search history.

(56) References Cited

U.S. PATENT DOCUMENTS

| | | | | |
|---|---|---|---|---|
| 2008/0313616 | A1* | 12/2008 | Malcolm | G06F 11/3688 717/127 |
| 2009/0217260 | A1 | 8/2009 | Gebhart et al. | |
| 2009/0222880 | A1 | 9/2009 | Mayer et al. | |
| 2010/0313196 | A1 | 12/2010 | De Atley et al. | |
| 2012/0030672 | A1 | 2/2012 | Zygmuntowicz et al. | |
| 2014/0053150 | A1* | 2/2014 | Barnett | G06F 9/455 718/1 |

FOREIGN PATENT DOCUMENTS

KR  10-2015-0047288 A  5/2015

OTHER PUBLICATIONS

Communication dated May 11, 2016 issued by International Searching Authority in counterpart International Application No. PCT/KR2015/014155.

* cited by examiner

*Primary Examiner* — Joseph P Hirl
*Assistant Examiner* — Chi D Nguy
(74) *Attorney, Agent, or Firm* — Sughrue Mion, PLLC

(57) ABSTRACT

Method and apparatus for security checking of image for container are provided, one of methods comprises, receiving an image for creating a container, wherein the container is an isolation region for an application executable on a host operating system, identifying one or more layers composing the image by parsing the image, collecting a path of a security configuration file, a security check object, from the one or more layers, and searching the collected path and checking whether a security configuration file violating a predetermined security policy is present.

11 Claims, 7 Drawing Sheets

FIG. 6
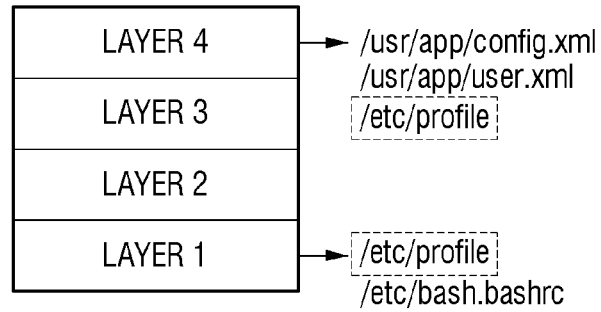
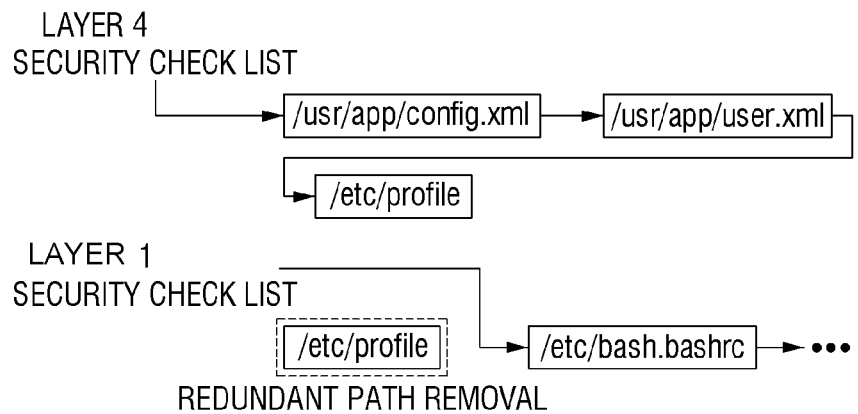
REDUNDANT PATH REMOVAL
FIG. 7
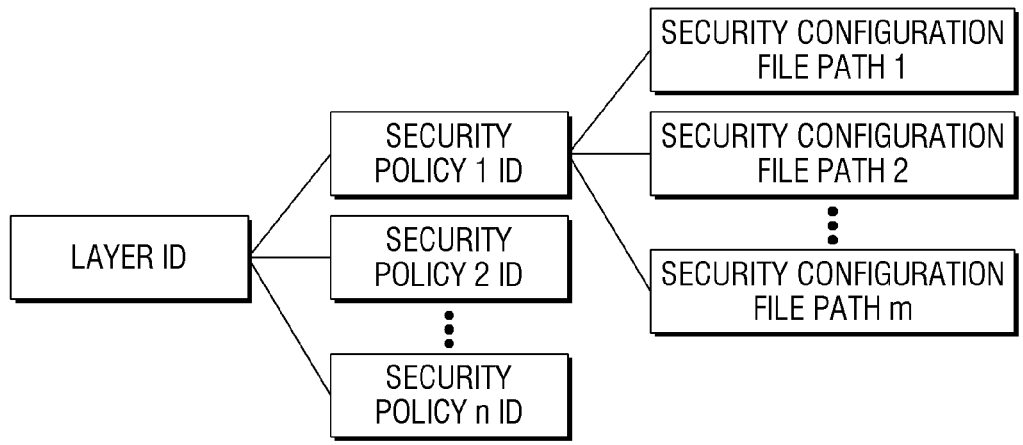

METHOD AND APPARATUS FOR SECURITY CHECKING OF IMAGE FOR CONTAINER

CROSS-REFERENCE TO RELATED APPLICATION

This application claims priority from Korean Patent Application No. 10-2015-0116471 filed on Aug. 19, 2015 in the Korean Intellectual Property Office, the disclosure of which is incorporated herein by reference in its entirety.

BACKGROUND

1. Field of the Invention

The present invention relates to a method and an apparatus for security checking an image for a container. More specifically, the present invention relates to a method for performing security checking on an image for creating a container and an apparatus for performing the method.

2. Description of the Related Art

In accordance with the rapid expansion of IT markets, development operating (DevOps) environments allowing for the rapid development and distribution of applications have been demanded. In accordance with the demand, a docker, an open source platform for developing, installing and executing applications, has been emerged. The docker may automatize a container technology to facilitate the use thereof.

The container technology is a solution for resolving problems as to how to stably operate software when the software is transferred from one computing environment to another computing environment. The container technology may be applied to a range from a developer's notebook to test environments, may be applied to a range from staging environments to a production, and may applied to a range from physical equipment within a datacenter to a virtual machine inside a private or public cloud. The container technology and the virtualization technology may have slightly similar aspects but may be differentiated from each other in the following aspect. When the virtualization technology is used, a package to be moved may be a virtual machine, wherein all of the entire operating system and applications may be included. A physical server driving three virtual machines may have a hypervisor and separate three operating systems driven thereabove. On the other hand, containers driving a single operating system may share a server for driving applications contained in three containers and an operating system kernel of the respective containers with one another. The shared portion of the operating system may be provided as read-only while each container may have a mount for writing itself. Therefore, rather than the use of the virtualization technology, the use of the container technology may be advantageous in terms of efficiency in employing computing resources.

A docker is an open platform for developing, installing and executing applications using the container technology. By utilizing the docker, an application may be separated from an infrastructure and the infrastructure may be managed in a similar scheme to that of the application. The docker may be helpful in a more rapid code installation, a more rapid test, and a more rapid distribution, thereby shortening cycles for executing coding and codes.

The docker may provide, based on a lightened container, high degrees of portability, scalability and availability. A docker container may be generated from an image. Therefore, the image is one of the most important security management objects. If security settings (a security configuration) of the image are defective, a container generated using the image may encounter fatal security attacks or may be used in the attacks. Therefore, a method for performing security checking on an image for creating a container and an apparatus for performing the method, have been required.

SUMMARY

An aspect of the present invention may provide a method for performing security checking on an image for creating a container before the container is executed on a host operating system and an apparatus for performing the method.

However, aspects of the present invention are not restricted to the one set forth herein. The above and other aspects of the present invention will become more apparent to one of ordinary skill in the art to which the present invention pertains by referencing the detailed description of the present invention given below.

In some embodiments, a security checking method comprises, receiving an image for creating a container, wherein the container is an isolation region for an application executable on a host operating system, identifying one or more layers composing the image by parsing the image, collecting a path of a security configuration file, a security check object, from the one or more layers, and searching the collected path and checking whether a security configuration file violating a predetermined security policy is present.

In some embodiments, a computer program product embodied on a non-transitory readable storage medium containing instructions that when executed by a processor cause a computer to, receive an image for creating a container, wherein the container is an isolation region for an application executable on a host operating system, identify one or more layers composing the image by parsing the image, collect a path of a security configuration file, a security check object, from the one or more layers and search the collected path and checking whether a security configuration file violating a predetermined security policy is present.

BRIEF DESCRIPTION OF DRAWINGS

The above and other aspects and features of the present invention will become more apparent by describing in detail exemplary embodiments thereof with reference to the attached drawings, in which:

FIG. 6 is view illustrating a redundant path removal according to an exemplary embodiment of the present invention;

FIG. 7 is a view illustrating a tree structure included in a familiar path storage according to an exemplary embodiment of the present invention;

DETAILED DESCRIPTION

Figure 1:
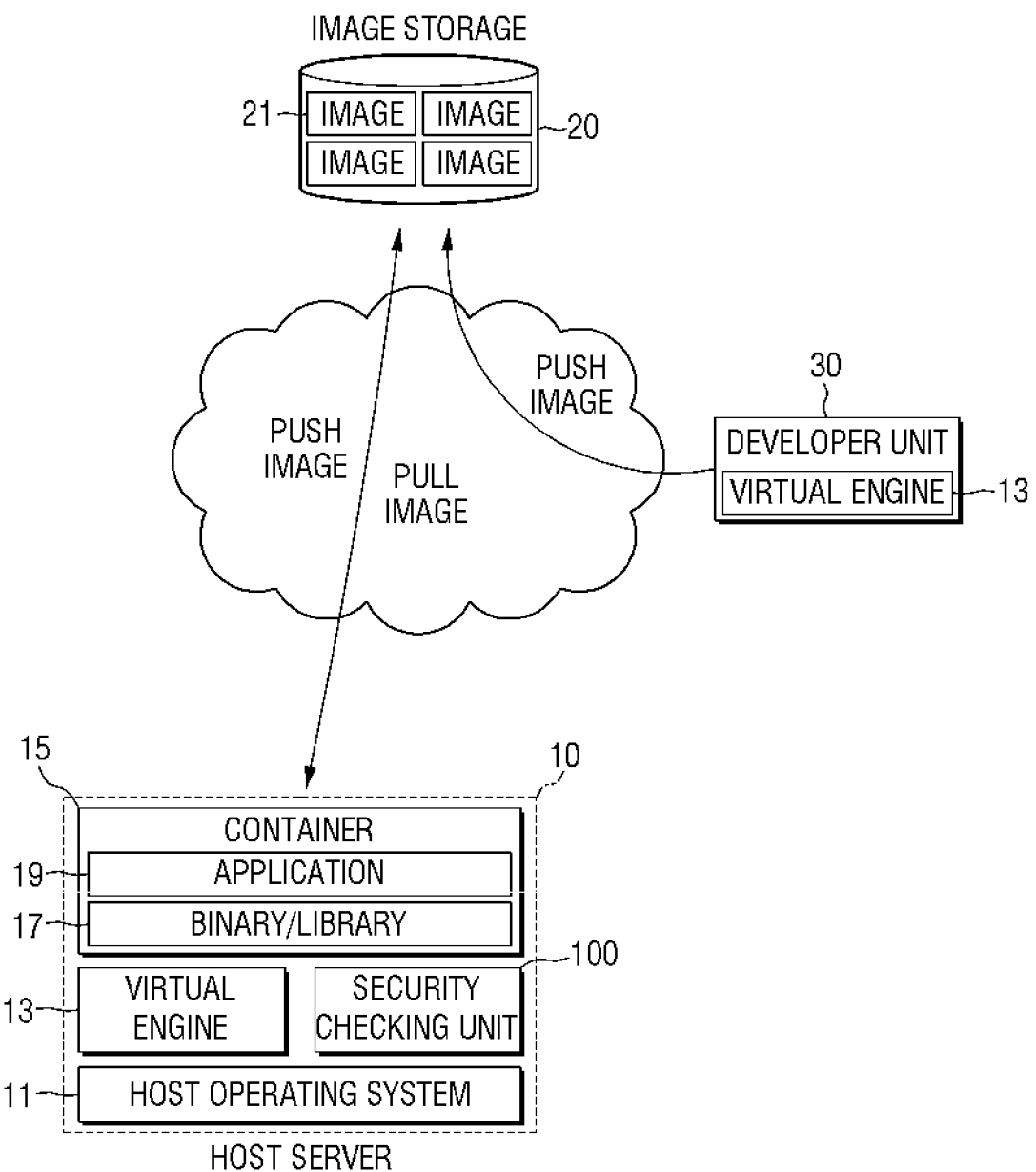
FIG. 1 is a view illustrating a host system according to an exemplary embodiment of the present invention.

Prior to descriptions of the specification, some terms used in the specification will be described.

A virtual engine may be a platform for separating applications from the infrastructure to build, ship or run the applications. Specifically, the virtual engine may assign resources (a CPU, a memory, a block I/O or networks, etc.) for running applications. The virtual engine may provide a file system, a process tree, or application running environments, isolated from a user account and the like. A virtual engine according to an embodiment of the present invention can be Docker, but is not limited thereto. The virtual engine may be operated based on an LXC (Linux Container) driver, but is not limited thereto and may be operated based on the Libcontainer.

An image may be a package for shipping applications. Specifically, an image may be created by a build command of the virtual engine. An image may be a read-only package, but is not limited thereto. An image may be configured of one or more layers. Then, the image may be used to create a container. One image may be used to create a single container and may also be used to create a plurality of containers.

A container is a virtual isolation region for running the applications. For example, the container may be formed in a specified area on a memory (RAM). Specifically, the container may be created from an image, by an execution command of the virtual engine. The container may support operating system-level virtualization. The container may be configured to include an application, a binary, and a library. That is, the container does not include a separate guest operating system (guest OS) and executes the application using the binary and library on the basis of a kernel of a host operating system (host OS).

A layer is an element composing an image. Specifically, when a portion of an image is changed or added, the virtual engine may not change an existing image into a new image, and may add a layer for the changed or added portion to the existing image. In the following description, a layer of the existing image will be described as an upper layer. In addition, a layer of the changed or added portion will be described as a lower layer. However, it will be apparent to a person having ordinary skill in the art that the upper layer may be differently expressed as a base layer or the like.

Then, the virtual engine may identify a layer composing an image on the basis of an update log of the image. In addition, the virtual engine may roll back an image to a previous state on the basis of a change history of the image.

Otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. The terminology used herein is for the purpose of describing particular embodiments only and is not intended to limit the full scope of the invention. As used herein, the singular forms are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Hereinafter, the present invention will be described in detail with reference to the attached drawings.

FIG. 1 is a view illustrating a host system according to an exemplary embodiment of the present invention. Respective components of the host system disclosed in FIG. 1 are functionally classified components and in actual physical environments, one or more components may be integrated with one another to be implemented.

Referring to FIG. 1, a host system according to an exemplary embodiment of the present invention may be configured to include a host server 10, an image storage 20, and a developer unit 30. Hereinafter, respective components will be described in detail.

The host server 10 is a server for providing a host service. In detail, the host service capable of being provided by the host server 10 may be PaaS (Platform as a Service), Iaas (Infrastructure as a Service) or SaaS (Software as a Service). That is, in this case, the host server 10 may be understood as a server providing a cloud computing service. The host server 10 may be a server providing various hosting services, in addition to the cloud computing service. The host server 10 may include a host operating system 11, a virtual engine 13, and a container 15.

In an exemplary embodiment, the image storage 20 may store various images 21 built by various external devices such as the developer unit 30 and the like. The external devices may refer to computing devices provided with various development platforms, in addition to the host server 10 and the developer unit 30. That is, in the exemplary embodiment, the developer unit 30 or the external device may push the built image to the image storage 20.

In another exemplary embodiment, the image 21 stored in the image storage 20 may be an image built by the virtual engine 13 of the host server 10. In this case, the virtual engine 13 of the host server 10 may push the built image 21 to the image storage 20. The virtual engine 13 of the host server 10 may pull the image 21 from the image storage 20.

The virtual engine 13 of the host server 10 may create the container 15 on the basis of the built or pulled image 21. The virtual engine 13 of the host server 10 may run an application 19 included in the container 15, using a binary and a library 17 on the basis of the kernel of the host operating system 11.

In particular, the host server 10 according to an exemplary embodiment of the present invention may include a security checking unit 100. The security checking unit 100 may perform security checking on the built or pulled image 21. That is, the security checking unit 100 may perform security checking on the image 21 for creating the container 15, in advance, before the virtual engine 13 executes the container 15. In addition, the security checking unit 100 may transmit a security check result to the developer unit 30 or a server (not shown) for managing a host service.

The security checking performed by the security checking unit 100 according to an exemplary embodiment of the present invention may include checking whether an unnecessary account among access accounts of the container 15 is present or not, checking validity of passwords of the access accounts of the container 15, checking an access path and authority of the container 15, checking an update log of the container 15, checking whether a security patch of the container 15 is applied or not, checking an unnecessary service among services executed through the application 19, checking a configuration of the application 19, checking whether data required in executing the application 19 is encrypted or not, or checking whether data unnecessary in executing the application 19 is deleted or not, but is not limited thereto.

The image storage 20 is a storage for storing and managing the image 21. More specifically, the image storage 20 may receive and store the image 21 pushed from the host server 10. In addition, the image storage 20 may transmit the image 21 such that the host server 10 is able to pull the image 21. The image storage 20 is a public storage but is not limited thereto, and may be a private storage. In addition, the image storage 20 according to an exemplary embodiment of the present invention may be a Docker Registry Hub, but is not limited thereto.

The developer unit 30 may be a device for developing the application 19. Specifically, the developer unit 30 according to an embodiment of the present invention may build the image 21 for the application 19. Then, the developer unit 30 may push the built image to the image storage 20.

The developer unit 30 according to another embodiment of the present invention may build the image 21 through the host server 10 in accordance with a user input. For example, the developer unit 30 may transmit a build command to the virtual engine 13 to build the image 21. In accordance with the user input, the developer apparatus 30 may update the image 21. For example, the developer unit 30 may transmit a commit command to the virtual engine 13 and may create the image 21 to which a layers for a changed portion is added.

The developer unit 30 may create the container 15 in accordance with a user input. For example, the developer unit 30 may transmit a create command to the virtual engine 13 to create the container 15. The developer unit 30 may execute the created container 15 in accordance with a user input. For example, the developer unit 30 may transmit an execution command to the virtual engine 13 and may execute the created container 15.

The developer unit 30 may push the image built in the host server 10 to the image storage 21, in accordance with a user input. For example, the developer unit 30 may transmit a push command to the virtual engine 13 and may push the image 21 built in the host server 10 to the image storage 20. The developer unit 30 may pull the image 21 stored in the image storage 20 to the host server 10 in accordance with a user input. For example, the developer unit 30 may transmit a pull command to the virtual engine 13 and may pull the image 21 stored in the image storage 20 to the host server 10.

The developer unit 30 according to another embodiment of the present invention may build the image 21 through an external device (not shown), in accordance with a user input. In this case, the external device may be a device able to provide specific environments in building the image 21, but is not limited thereto. In addition, developer unit 30 may push the image 21 built through the external device (not shown) to the image storage 20.

In addition, the developer unit 30 may receive a security check result of the security checking performed by the security checking unit 100, and may output the received security check result on a screen.

In conclusion, the host system according to an exemplary embodiment of the present invention may perform security checking on the image 21 before the container 15 is executed in the host server 10, thereby preventing risks that may be caused by the execution of the container 15, in advance. In addition, the host system according to an exemplary embodiment of the present invention may perform security checking, independently of the execution of the container 15, thereby determining environments and time for the security checking, independently of whether the container 15 is executed or not. Further, the host system according to an exemplary embodiment of the present invention may perform security checking while not consuming resources required in the execution of the container 15.

Figure 2:
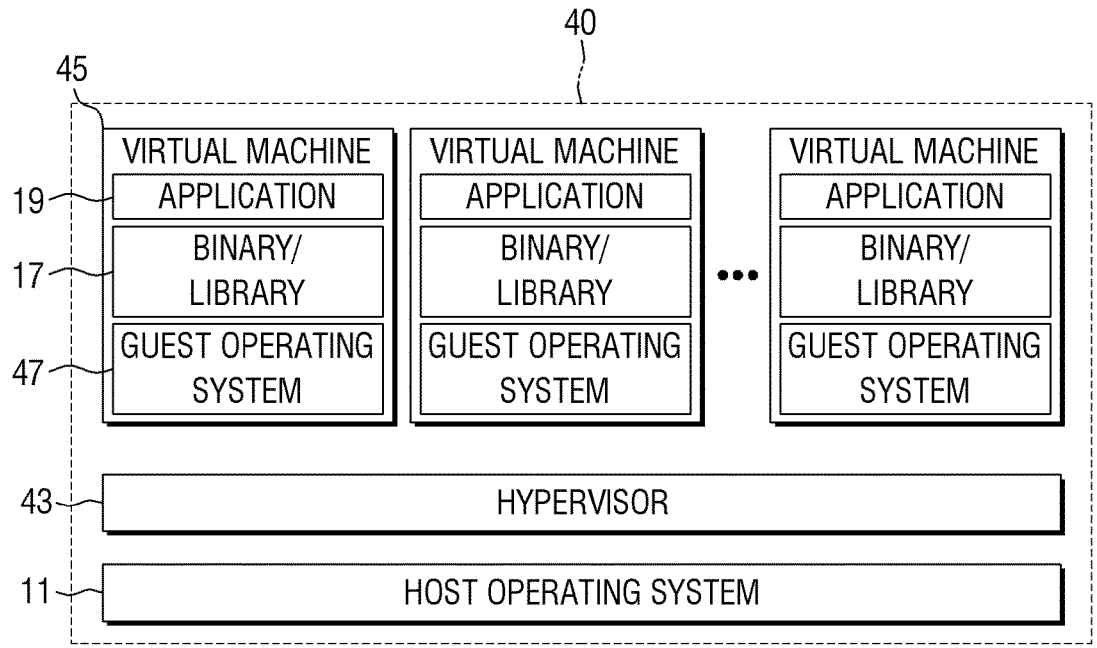
FIG. 2 is a view illustrating a host server according to the related art.
Figure 3:
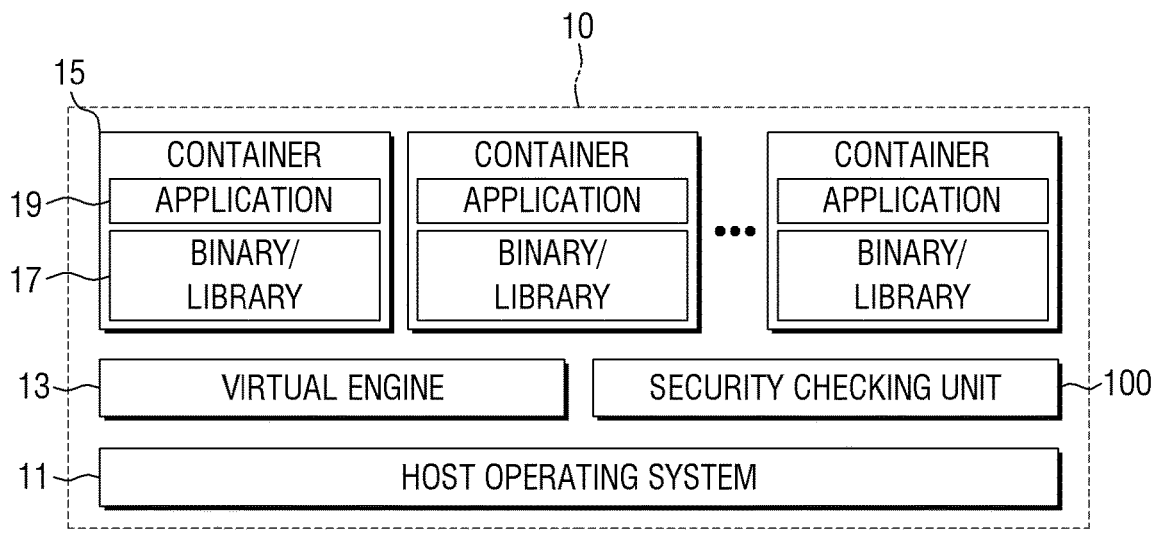
FIG. 3 is a view illustrating a host server according to an exemplary embodiment of the present invention.

Hereinafter, with reference to FIG. 2 and FIG. 3, a host server according to the related art and the host server 10 according to an exemplary embodiment of the present invention will be compared and described. FIG. 2 is a view illustrating a host server according to the related art. FIG. 3 is a view illustrating a host server according to an exemplary embodiment of the present invention.

Referring to FIG. 2, in the host server according to the related art, one or more virtual machines 45 may be executed on the basis of the host operating system 11 and a hypervisor 43. In addition, the host server according to the related art may execute the application 19 using the binary and the library 17 on the basis of a guest operating system (guest OS) 47 included in each virtual machine 45.

However, the host server according to the related art consumes a lot of resources in order to redundantly execute the host operating system 11 and the guest operating system 47 for each virtual machine 45. In addition, the host server according to the related art may execute the application 19 executed on the guest operating system 47, through the hypervisor 43 and the host operating system 11, whereby an execution speed of the application 19 may be decreased. Referring to FIG. 3, in the host server 10 according to an embodiment of the present invention, one or more containers 15 may be executed on the basis of the host operating system 11 and the virtual engine 13. The host server 10 may execute the application 19 using the binary and the library 17, on the basis of the kernel of the host operating system 11.

Thus, the host server 10 according to an embodiment of the present invention does not consume resources for running the guest operating system. The host server 10 may directly execute the application 19 through the host operating system 11, whereby a decrease in execution speed of the application 19 may not occur. Further, the container 15 does not include the guest operating system, whereby a capacity of the image for creating the container 15 may be reduced.

In addition, the host server 10 according to an embodiment of the present invention may perform security checking on the image 21 using the security checking unit 100, prior to the execution of the container 15.

Figure 4:
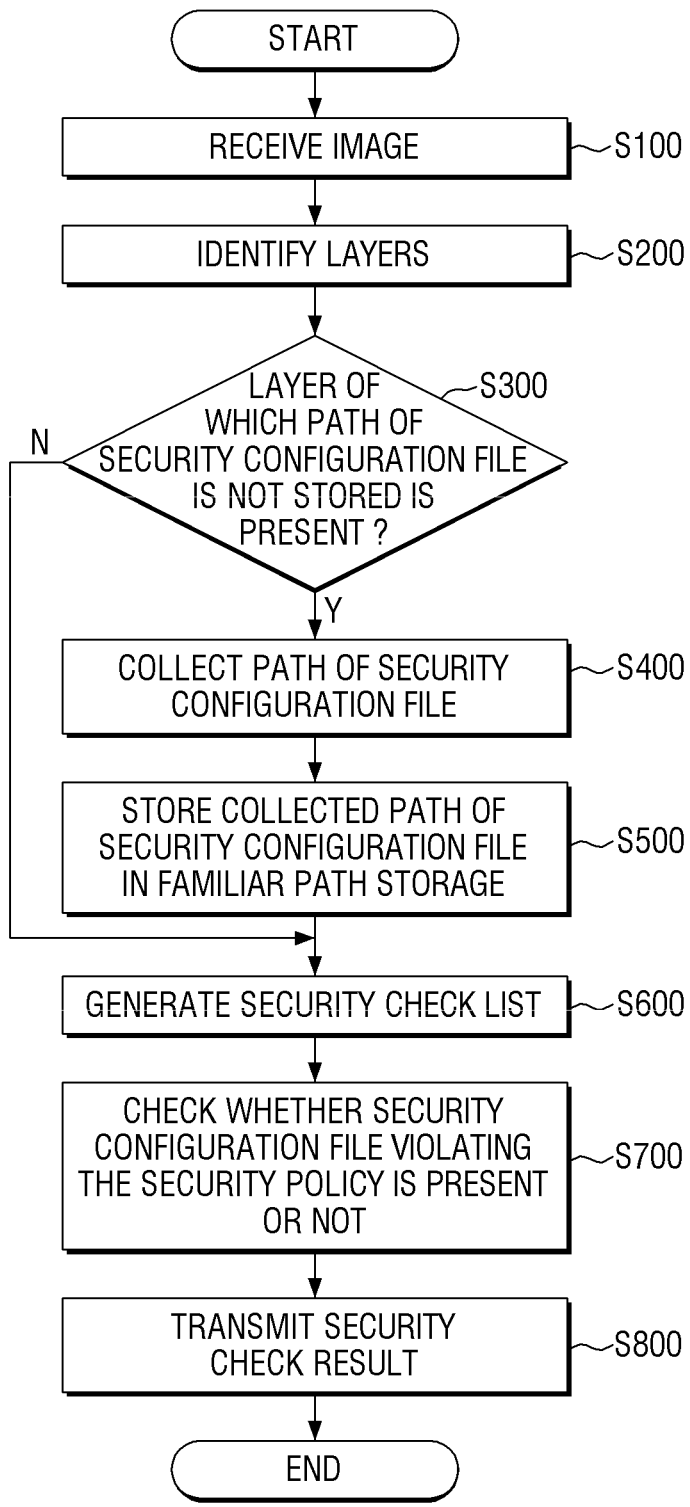
FIG. 4 is a flow chart illustrating a security checking method according to an exemplary embodiment of the present invention.

Hereinafter, the security checking unit 100 included in the host server 10 according to an embodiment of the present invention will be described. FIG. 4 is a flow chart illustrating a security checking method according to an exemplary embodiment of the present invention.

Referring to FIG. 4, the security checking unit 100 may receive the image 21 for creating the container 15 from the image storage 20 (S100). Specifically, the security checking unit 100 may pull the image 21 from the image storage 20. The security checking unit 100 may receive the pulled image 21.

The security checking unit 100 may parse the received image 21 and may identify one or more layers composing the image 21 (S200). Specifically, the security checking unit 100 may parse the image on the basis of an update log of the received image 21 and may identify the one or more layers. The update log may include an identifier of the image, a date and time in which a new layer is added to the image, capacity of the layer newly added to the image, and a command for adding the new layer to the image, but is not limited thereto. That is, the update log may be a history of the image 21 regarding the addition of a layer.

The security checking unit 100 may determine whether a layer of which a path of a security configuration file is not stored in a familiar path storage, is present, in the identified one or more layers (S300). The path of the security configuration file is a path along which an object file of security checking is positioned on a file system. The familiar path storage is a storage for accumulating and managing the path of the security configuration file of the layer on which the security checking has been performed by the security checking unit 100. The familiar path storage may include a tree structure configured of a root node, a child node, and a leaf node. In this case, the root node may be configured to include an identifier of the layer, the child node may be configured to include an identifier of a security policy, and the leaf node may be configured to include the path of the security configuration file.

As a result of the determination, when a layer of which the path of the security configuration file is not stored is present, the security checking unit 100 may collect a path of a security configuration file from the file system of the layer of which the path of the security configuration file is not stored (S400). Specifically, the security checking unit 100 may scan the file system of the layer of which the path of the security configuration file is not stored, and may collect a path of a security configuration file matched with the format of a security configuration file stored in a security policy storage. The security policy storage is a storage for managing a configuration value which the security configuration file needs to have in accordance with the format of the security configuration file and the security policy. The security checking unit 100 may additionally store the collected path of the security configuration file in the familiar path storage (S500).

The security checking unit 100 may generate a security check list (S600). Specifically, the security checking unit 100 may generate a security check list configured of the path of the security configuration file stored in the familiar path storage. In this case, a new path of a security configuration file newly collected from the pre-stored path of the security configuration file and the file system may be stored in the familiar path storage.

In addition, when redundant paths of security configuration files are present, the security checking unit 100 may generate a security check list after removing one path of the security configuration file. Specifically, when a path of a first security configuration file of a first layer and a path of a second security configuration file of a second layer are identical to each other, the security checking unit 100 may remove one of the path of the first security configuration file and the path of the second security configuration file. In particular, when the first layer is an upper layer of the second layer, the security checking unit 100 may remove the first security configuration file. When the first layer is a lower layer of the second layer, the security checking unit 100 may remove the second security configuration file. That is, the security checking unit 100 may maintain a security configuration file of a relatively recently added layer and remove a security configuration file of a relatively formerly added layer among layers composing the image 21.

The security checking unit 100 may search the security check list and may check whether a security configuration file violating the security policy is present or not (S700). Specifically, the security checking unit 100 may determine whether a configuration value of a security configuration file positioned on a path of the security configuration file included in the security check list violates the security policy. In addition, the security checking unit 100 may determine whether the configuration value of the security configuration file violates the security policy, on the basis of a configuration value which the security configuration file stored in the security policy storage needs to have. More specifically, when the security configuration file includes the presence of an unnecessary account among access accounts of the container 15, the expiration of passwords of the access accounts of the container 15, the presence of an unauthorized access path and authority of the container 15, the non-application of the security patch of the container 15, the presence of an unnecessary service among services executed through the application 19, a configuration of the application 19 allowing an unauthorized access, the non-encryption of data required in executing the application 19, or the presence of data unnecessary in executing the application 19, the security checking unit 100 may determine that the security configuration file violates the security policy, but is not limited thereto.

The security checking unit 100 may generate and transmit a security check result to at least one of a server (not shown) for managing a service that may be provided through the execution of the application, and the developer unit 30 of the application. The security check result may include the path of the security configuration file violating the security policy and violated items of the security policy, but is not limited thereto.

Figure 5:
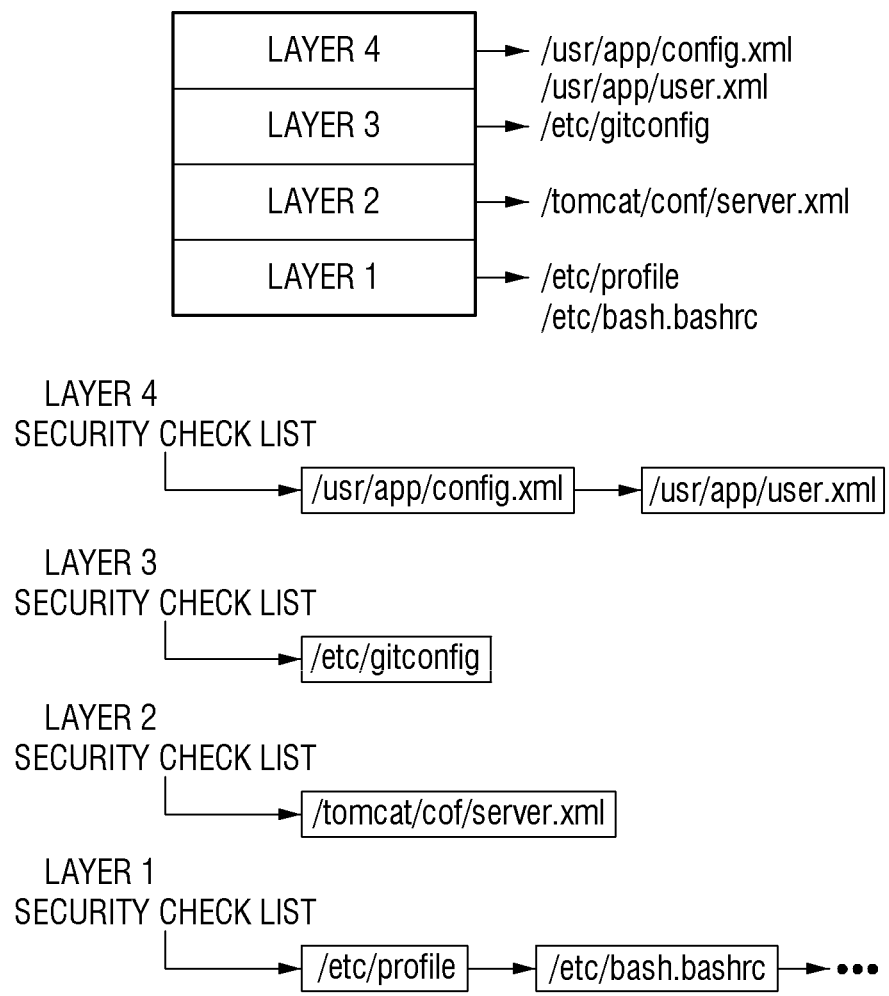
FIG. 5 is view illustrating layers and security check lists of an image according to an exemplary embodiment of the present invention.

FIG. 5 is view illustrating layers and security check lists of the image 21 according to an exemplary embodiment of the present invention. It is assumed that the image 21 according to an exemplary embodiment of the present invention illustrated in FIG. 5 may include the application 19 and binaries and libraries 17 of Ubuntu, Apache tomcat and Git for executing the application 19. It is assumed that among four layers composing the image 21, a first layer is a layer for the binary and library of Ubuntu, a second layer is a layer for the binary and library of Apache tomcat, a third layer is a layer for the binary and library of Git, and a fourth layer is configured of an execution code of the application 19.

Referring to FIG. 5, the security checking unit 100 may parse the image 21 and may identify four layers thereof.

The security checking unit 100 may collect a path of a security configuration file from the identified layers, on the basis of the familiar path storage. Specifically, the security checking unit 100 may collect, from the first layer, a path of a security configuration file, such as "/etc/profile", "/etc/bash.bashrc" and the like. The security checking unit 100 may collect, from the second layer, a path of a security configuration file, such as "/tomcat/conf/server.xml". The security checking unit 100 may collect, from the third layer, a path of a security configuration file, such as "/etc/gitconfig". The security checking unit 100 may collect, from the fourth layer, a path of a security configuration file, such as "/usr/app/config.xml" and "/usr/app/user.xml".

The security checking unit 100 may generate security check lists for the respective layers, on the basis of the path of the security configuration file stored in the familiar path storage and the newly collected paths of the security configuration file. Specifically, the security check list of the first layer, generated by the security checking unit 100, may include two or more nodes having values of "/etc/profile", "/etc/bash.bashrc" and the like. The security check list of the second layer, generated by the security checking unit 100, may include a node having a value of "/tomcat/conf/server.xml". The security check list of the third layer, generated by the security checking unit 100, may include a node having a value of "/etc/gitconfig". The security check list of the fourth layer, generated by the security checking unit 100, may include two or more nodes having values of "/usr/app/config.xml" and "/usr/app/user.xml".

FIG. 6 is view illustrating a redundant path removal according to an exemplary embodiment of the present invention. It is assumed that among four layers composing the image 21 according to an exemplary embodiment of the present invention, the path of the security configuration file of the first layer and the path of the security configuration file of the fourth layer are redundant (overlap with each other).

Referring to FIG. 6, the security checking unit 100 may parse the image 21 and may identify four layers thereof. The security checking unit 100 may collect, from the first layer, a path of a security configuration file, such as "/etc/profile", "/etc/bash.bashrc" and the like. The security checking unit 100 may collect, from the fourth layer, a path of a security configuration file, such as "/usr/app/config.xml", "/usr/app/user.xml" and "/etc/profile".

The security checking unit 100 may determine that the path "/etc/profile" of the security configuration file of the first layer and the path "/etc/profile" of the security configuration file of the fourth layer are redundant. Since the first layer is an upper layer of the fourth layer, the redundant path of the security configuration file of the first layer may be removed.

The security checking unit 100 may generate security check lists for the respective layers after the removal of the redundant path of the security configuration file. Specifically, the security check list of the first layer, generated by the security checking unit 100, may not include a node having a value of "/etc/profile", but may include one or more nodes having a value of "/etc/bash.bashrc" and the like. The security check list of the fourth layer, generated by the security checking unit 100, may include three nodes having values of "/usr/app/config.xml", "/usr/app/user.xml" and "/etc/profile".

Therefore, the security checking unit 100 according to an exemplary embodiment of the present invention may remove the redundant path of the security configuration file, thereby shortening time consumed in security checking.

FIG. 7 is a view illustrating a tree structure included in a familiar path storage according to an exemplary embodiment of the present invention.

Referring to FIG. 7, the familiar path storage may accumulate and manage the path of the security configuration file of the layer on which the security checking has been performed.

The tree structure of the familiar path storage may have three levels. Specifically, the root node on a first level of the tree structure may include an identifier of the layer. The child node on a second level of tree structure may include an identifier of the security policy. The leaf node on a third level of tree structure may include the path of the security configuration file.

Therefore, the security checking unit 100 according to an exemplary embodiment of the present invention may reuse the path of the security configuration file on which the security checking has been performed, thereby shortening time consumed in collecting paths of security configuration files of all layers composing the image 21.

Until now, the methods according to exemplary embodiments of the present invention described with reference to FIG. 4 through FIG. 7 may be performed by the execution of a computer program implemented as a computer readable code. The computer program may be transmitted from a first computing device to a second computing device over networks such as the Internet or the like and may be installed in the second computing device. Here, the first computing device and the second computing device may include all of a stationary computing device such as a desktop, a workstation or the like, a mobile computing device such as a smart phone, a tablet, a phablet, a laptop or the like, and a wearable computing device such as a smart watch, smart glasses, a smart band or the like.

Hereinafter, a logical configuration of the security checking unit 100 included in the host server 10 according to an exemplary embodiment of the present invention will be described in detail.

Figure 8:
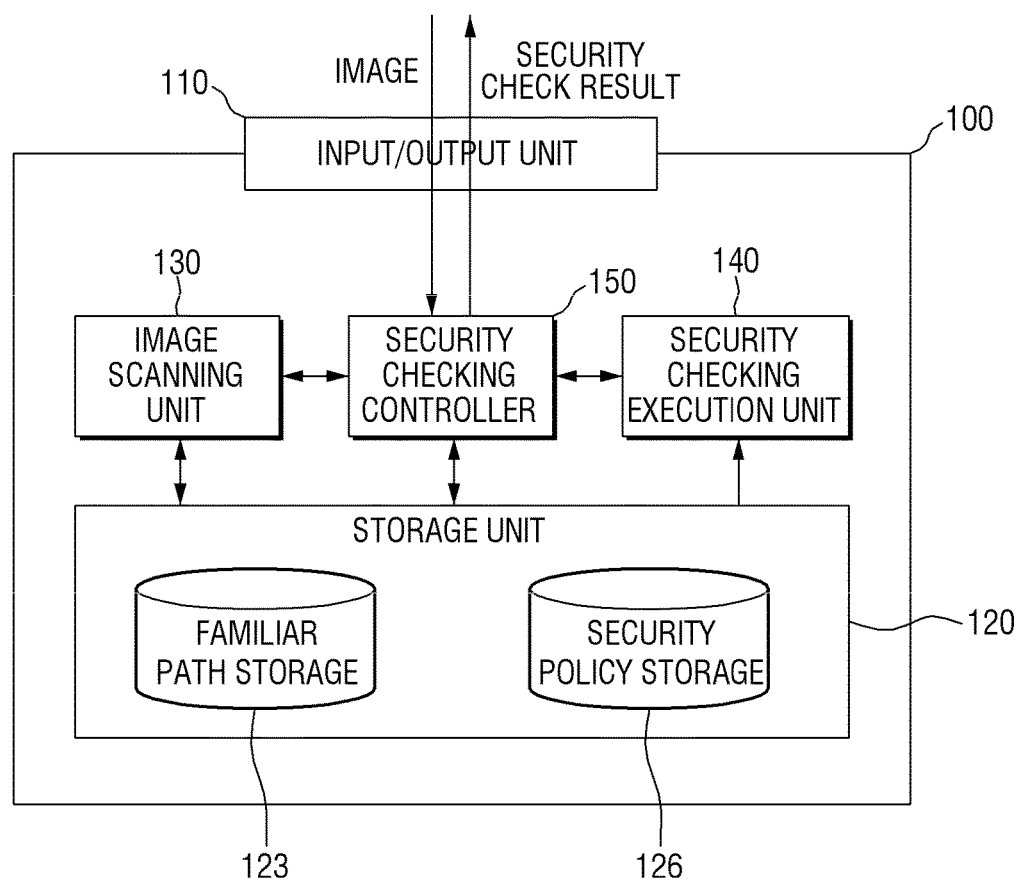
FIG. 8 is a block diagram of a security checking unit according to an exemplary embodiment of the present invention.

FIG. 8 is a block diagram of the security checking device 100 according to an exemplary embodiment of the present invention. Referring to FIG. 8, the security checking device 100 may be configured to include an input/output unit 110, a storage unit 120, an image scanning unit 130, a security checking execution unit 140, and a security checking controller 150.

Describing respective components, the input/output unit 110 may input and output data required in operations of the security checking device 100. Specifically, the input/output unit 110 may receive the image 21 on which security checking will be performed, that is, the image 21 pulled from the image storage 20. The input/output unit 110 may write a security check result generated through the security checking controller 150 on a file, or may transmit the security check result over networks.

The storage unit 120 may store data required in operations of the security checking device 100. Specifically, the storage unit 120 may include a familiar path storage 123 and a security policy storage 126. The familiar path storage is a storage for accumulating and managing the path of the security configuration file of the layer on which the security checking has been performed by the security checking unit 100. The security policy storage 126 is a storage for managing a configuration value which the security configuration file needs to have in accordance with the format of the security configuration file and the security policy.

The image scanning unit 130 may scan a security configuration file. Specifically, the image scanning unit 130 may scan the file system of the layer of which the path of the security configuration file is not stored in the familiar path storage 123. The image scanning unit 130 may collect a path of a security configuration file matched with the format of a security configuration file stored in the security policy storage 126. The image scanning unit 130 may additionally store the collected path of the security configuration file in the familiar path storage 123.

The security checking execution unit 140 may check whether a security configuration file violating the security policy is present or not. Specifically, the security checking execution unit 140 may determine whether a configuration value of a security configuration file positioned on a path of the security configuration file included in the security check list violates the security policy. The security checking execution unit 140 may determine whether the configuration value of the security configuration file violates the security policy, on the basis of a configuration value which the security configuration file stored in the security policy storage 126 needs to have. More specifically, when the security configuration file includes the presence of an unnecessary account among access accounts of the container 15, the expiration of passwords of the access accounts of the container 15, the presence of an unauthorized access path and authority of the container 15, the non-application of the security patch of the container 15, the presence of an unnecessary service among services executed through the application 19, a configuration of the application 19 allowing an unauthorized access, the non-encryption of data required in executing the application 19, or the presence of data unnecessary in executing the application 19, the security checking execution unit 140 may determine that the security configuration file violates the security policy, but is not limited thereto.

The security checking controller 150 may control the input/output unit 110, the storage unit 120, the image scanning unit 130, and the security checking execution unit 140 to perform security checking. Specifically, the security checking controller 150 may parse the image 21 received through the input/output unit 110 and may identify one or more images composing the image 21. When a layer of which a path of a security configuration file is not stored in the familiar path storage 123, is present, in the identified one or more layers, the security checking controller 150 may collect the path of the security configuration file through the image scanning unit 130. The security checking controller 150 may generate a security check list configured of the path of the security configuration file stored in the familiar path storage 123. In particular, when redundant paths of security configuration files are present, the security checking controller 150 may generate security check lists after removing one path of the security configuration file. The security checking controller 150 may check whether a security configuration file violating the security policy among security configuration files included in the security check lists is present or not, through the security checking execution unit 140 The security checking controller 150 may generate a security check result. The security checking controller 150 may output the security check result through the input/output unit 110.

Until now, the respective components of FIG. 8 may refer to software or hardware components such as a FPGA (Field-Programmable Gate Array) or an ASIC (Application-Specific Integrated Circuit). However, the components are not limited to software or hardware and may be configured in an addressable storage medium or may be configured to execute one or more processors. Functions provided by the components may be implemented by further divided components and alternatively, may be implemented by a single component performing a specific function by combining a plurality of components.

Figure 9:
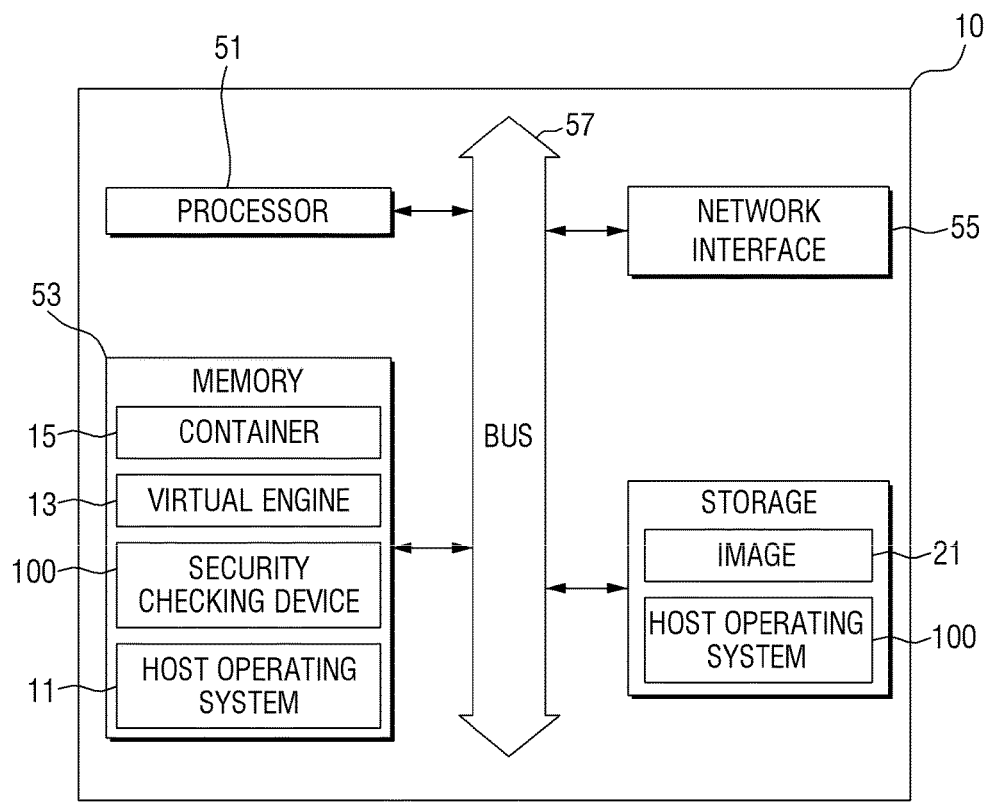
FIG. 9 is a hardware configuration view of the host server according to an exemplary embodiment of the present invention.

FIG. 9 is a hardware configuration view of the host server according to an exemplary embodiment of the present invention. Referring to FIG. 9, the host server 10 may be configured to include a processor 51, a memory 53, a network interface 55, a data bus 57 and a storage 59.

The processor 51 may be configured of one or more CPUs (Central Processing Units) for executing an operation. In the memory 53, the host operating system 11, the virtual engine 13 and the container 15 may be disposed. Particularly, in the memory 53, the security checking unit 100 for performing the security checking method according to an exemplary embodiment of the present invention may be disposed. The network interface 55 may transmit or receive data to or from the image storage 20 or the developer unit 30. The data bus 57 may serve as a transfer path for transferring data among the processor 51, the memory 53, the network interface 55, and the storage 59. The storage 90 may store the image 21 and the security checking device 100 for performing the security checking method according to an exemplary embodiment of the present invention.

More specifically, the storage 59 may store a computer program including an instruction receiving the image 21 for creating the container 15, wherein the container 15 is an isolation region for the application 19 executable on the host operating system 11, an instruction for identifying one or more layers composing the image 21 by parsing the image 21, an instruction for collecting a path of a security configuration file, a security check object, from the one or more layers, and an instruction for searching the collected path and checking whether a security configuration file violating a predetermined security policy is present.

As set forth above, according to an exemplary embodiment of the present invention, security checking may be performed on the image before the container is executed, thereby preventing risks that may be caused by the execution of the container, in advance. In addition, security checking may be performed, independently of the execution of the container, thereby determining environments and time for the security checking, independently of whether the container is executed or not. Further, security checking may be performed while not consuming resources required in the execution of the container.

Further, according to an exemplary embodiment of the present invention, the path of the security configuration file on which the security checking has been performed may be reused, and the redundant path of the security configuration file may be removed, thereby shortening time consumed in security checking.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A security checking method comprising:
   receiving an image for creating a container, the container being an isolation region for an application executable on a host operating system;
   identifying one or more layers constituting the image by parsing the image;
   collecting a path corresponding to a security configuration file, the security configuration file being a security check object, from the one or more layers; and
   searching the collected path corresponding to the security configuration file and checking whether the security configuration file violates a predetermined security policy,
   wherein the one or more layers are elements added to the image for describing a changed or added portion of the image.

2. The security checking method of claim 1, wherein the identifying of the one or more layers comprises identifying the one or more layers by parsing the image based on an update log of the image.

3. The security checking method of claim 1, wherein the collecting of the path corresponding to the security configuration file comprises:
- determining whether a layer, in the one or more layers, of which a path corresponding to the security configuration file is stored in a predetermined familiar path storage is present; and
- when the layer of which the path corresponding to the security configuration file is not stored in the predetermined familiar path storage is present, collecting the path of the security configuration file from a file system of the layer.

4. The security checking method of claim 3, further comprising:
- generating security check lists comprising a path corresponding to the security configuration stored in the familiar path storage, and the collected path corresponding to the security configuration file.

5. The security checking method of claim 4, wherein the generating of the security check lists comprises: when a first path of a first security configuration file of a first layer of the one or more layers is identical to a second path of a second security configuration file of a second layer of the one or more layers, removing one from among the first path and the second path.

6. The security checking method of claim 5, wherein the removing the one from among the first path and the second path comprises removing the first path when the first layer is an upper layer of the second layer, and removing the second path when the first layer is a lower layer of the second layer.

7. The security checking method of claim 3, further comprising:
- storing the collected path corresponding to the security configuration file in the familiar path storage, after the collecting of the path of the security configuration file.

8. The security checking method of claim 7, wherein the familiar path storage comprises a tree structure comprising a root node, a child node, and a leaf node, and the root node comprises an identifier of a layer of the one or more layers, the child node comprises an identifier of the predetermined security policy, and the leaf node comprises the path corresponding to the security configuration file.

9. The security checking method of claim 1, further comprising:
- when the security configuration file violates the predetermined security policy, generating a security check result including the path corresponding to the security configuration file and violated items of the predetermined security policy.

10. The security checking method of claim 9, wherein the generating of the security check result further comprises transmitting the security check result to at least one from among a server for managing a service capable of being provided through an execution of the application, and a developer unit of the application.

11. A non-transitory computer-readable medium having recorded thereon instructions which, when executed by a computer, cause the computer to perform:
- receiving an image for creating a container, the container being an isolation region for an application executable on a host operating system;
- identifying one or more layers constituting the image by parsing the image;
- collecting a path corresponding to a security configuration file, the security configuration file being a security check object, from the one or more layers; and
- searching the collected path corresponding to the security configuration file and checking whether the security configuration file violates a predetermined security policy,
- wherein the one or more layers are elements added to the image for describing a changed or added portion of the image.

* * * * *